United States Patent
Jang et al.

(10) Patent No.: US 10,514,308 B2
(45) Date of Patent: Dec. 24, 2019

(54) METHOD FOR DETECTING ENVIRONMENTAL VALUE IN ELECTRONIC DEVICE AND ELECTRONIC DEVICE

(71) Applicant: Samsung Electronics Co., Ltd., Suwon-si, Gyeonggi-do (KR)

(72) Inventors: Yoon-Kyu Jang, Yongin-si (KR); Han-Sub Jung, Yongin-si (KR); Chee-Hoon Lee, Incheon (KR); Jeong-Min Park, Suwon-si (KR); Jae-Woong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 15/225,060

(22) Filed: Aug. 1, 2016

(65) Prior Publication Data

US 2016/0341608 A1   Nov. 24, 2016

Related U.S. Application Data

(63) Continuation of application No. 14/211,680, filed on Mar. 14, 2014, now Pat. No. 9,404,812.

(60) Provisional application No. 61/783,160, filed on Mar. 14, 2013.

(30) Foreign Application Priority Data

Feb. 28, 2014   (KR) ........................ 10-2014-0024128

(51) Int. Cl.
*G01K 13/00*   (2006.01)
*H04M 1/725*   (2006.01)
*G06F 11/30*   (2006.01)

(52) U.S. Cl.
CPC .......... *G01K 13/00* (2013.01); *G06F 11/3013* (2013.01); *G06F 11/3058* (2013.01); *H04M 1/72522* (2013.01); *G01K 2217/00* (2013.01); *H04M 2250/12* (2013.01)

(58) Field of Classification Search
CPC ......................... G01K 13/00; G01K 2217/00; G06F 11/3058; H04M 2250/12; H04M 1/72522
See application file for complete search history.

(56) References Cited

U.S. PATENT DOCUMENTS

| | | | |
|---|---|---|---|
| 6,160,383 A | 12/2000 | Carkner | |
| 6,650,322 B2 | 11/2003 | Dai et al. | |
| 6,769,526 B2 | 8/2004 | Iida et al. | |
| 6,814,485 B2 | 11/2004 | Gauthier et al. | |
| 6,900,714 B1 | 5/2005 | Huang et al. | |
| 7,064,994 B1 | 6/2006 | Wu | |
| 7,364,353 B2 * | 4/2008 | Kolk | G01K 1/20 374/1 |
| 7,412,614 B2 | 8/2008 | Ku | |

(Continued)

*Primary Examiner* — Thomas J. Hiltunen
(74) *Attorney, Agent, or Firm* — Jefferson IP Law, LLP

(57) ABSTRACT

A method of detecting an environment vale of an electronic device is provided. The method includes measuring a state of one or more units related to the electronic device, determining a value based at least in part on the measured state of the one or more units related to the electronic device, determining an operation state of the electronic device according to the value, and generating an approximated environment value according to the operation state. Further, other various embodiments are available.

20 Claims, 9 Drawing Sheets

(56) References Cited

U.S. PATENT DOCUMENTS

| | | | |
|---|---|---|---|
| 7,515,447 B2 | 4/2009 | Ronkainen et al. | |
| 7,734,939 B2 | 6/2010 | Kolinummi et al. | |
| 8,148,994 B2 | 4/2012 | Yamashita et al. | |
| 8,238,185 B2 * | 8/2012 | Lee | G11C 5/143 365/189.09 |
| 8,356,194 B2 * | 1/2013 | Carlson | G06F 1/32 713/320 |
| 8,397,088 B1 | 3/2013 | Ghose | |
| 8,442,697 B2 | 5/2013 | Schmitz et al. | |
| 8,684,596 B2 | 4/2014 | Nishi et al. | |
| 8,766,704 B2 * | 7/2014 | Takayanagi | G06F 1/206 327/513 |
| 8,774,419 B2 | 7/2014 | Risbo et al. | |
| 8,788,866 B2 | 7/2014 | Anderson et al. | |
| 8,874,949 B2 * | 10/2014 | Wells | G06F 1/26 713/322 |
| 8,907,631 B1 * | 12/2014 | Gurries | H02J 7/0073 320/138 |
| 8,972,759 B2 * | 3/2015 | Doshi | G06F 1/3203 713/320 |
| 8,975,951 B2 * | 3/2015 | Inoue | G06F 1/206 327/513 |
| 8,996,330 B2 * | 3/2015 | Anderson | G06F 1/203 702/130 |
| 9,014,384 B2 | 4/2015 | Gautama | |
| 9,046,424 B2 | 6/2015 | Hsu et al. | |
| 9,366,584 B2 * | 6/2016 | Graf | G01K 1/20 |
| 9,784,624 B2 * | 10/2017 | Niederberger | G01K 1/20 |
| 10,019,188 B2 * | 7/2018 | Chung | G06F 3/0629 |
| 2005/0223255 A1 | 10/2005 | Watts, Jr. | |
| 2006/0117194 A1 | 6/2006 | Nishida | |
| 2007/0153944 A1 * | 7/2007 | Kerstenbeck | H03L 1/022 375/344 |
| 2008/0285197 A1 | 11/2008 | Nakamura | |
| 2009/0251108 A1 * | 10/2009 | Chao | H02J 7/0091 320/153 |
| 2010/0146313 A1 | 6/2010 | Jager | |
| 2011/0119018 A1 * | 5/2011 | Skarp | G01K 7/42 702/130 |
| 2011/0213947 A1 | 9/2011 | Mathieson et al. | |
| 2011/0224940 A1 | 9/2011 | Howe | |
| 2011/0301777 A1 | 12/2011 | Cox et al. | |
| 2011/0307208 A1 * | 12/2011 | Graf | G01D 18/008 702/104 |
| 2012/0223764 A1 | 9/2012 | Allen-Ware et al. | |
| 2012/0267442 A1 * | 10/2012 | Choi | G05D 23/1902 236/51 |
| 2013/0019120 A1 | 1/2013 | Salsbery et al. | |
| 2013/0114437 A1 | 5/2013 | Yoo et al. | |
| 2013/0166093 A1 * | 6/2013 | Kim | G06F 1/206 700/299 |
| 2013/0261814 A1 * | 10/2013 | Shrall | G06F 1/206 700/286 |
| 2014/0015333 A1 | 1/2014 | Byun et al. | |
| 2014/0145849 A1 | 5/2014 | Huang et al. | |
| 2014/0163765 A1 | 6/2014 | Jain et al. | |
| 2014/0240031 A1 | 8/2014 | Vadakkanmaruveedu et al. | |
| 2014/0266228 A1 | 9/2014 | Baruzzi et al. | |
| 2014/0269811 A1 * | 9/2014 | Maleki | H01M 10/486 374/1 |
| 2014/0328367 A1 | 11/2014 | Niederberger et al. | |
| 2015/0091638 A1 * | 4/2015 | Carlson | G05F 1/463 327/540 |
| 2015/0177394 A1 | 6/2015 | Dolinsky et al. | |
| 2015/0192477 A1 * | 7/2015 | Sacchetti | G01K 1/20 374/152 |
| 2015/0241486 A1 | 8/2015 | Christensen et al. | |
| 2015/0332780 A1 * | 11/2015 | Jang | G11C 7/04 365/185.18 |
| 2015/0349570 A1 * | 12/2015 | Niederberger | G01K 1/20 320/153 |
| 2016/0249813 A1 * | 9/2016 | Zhang | A61B 5/01 600/549 |

* cited by examiner

METHOD FOR DETECTING ENVIRONMENTAL VALUE IN ELECTRONIC DEVICE AND ELECTRONIC DEVICE

CROSS-REFERENCE TO RELATED APPLICATION(S)

This application is a continuation application of prior application Ser. No. 14/211,680, filed on Mar. 14, 2014, which claimed the benefit under 35 U.S.C. § 119(e) of a U.S. Provisional application filed on Mar. 14, 2013 in the U.S. Patent and Trademark Office and assigned Ser. No. 61/783,160, and under 35 U.S.C. § 119(a) of a Korean patent application filed on Feb. 28, 2014 in the Korean Intellectual Property Office and assigned Serial number 10-2014-0024128, the entire disclosure of each of which is hereby incorporated by reference.

TECHNICAL FIELD

The present disclosure relates to an electronic device and a method of detecting an environmental value of the electronic device. More particularly, the present disclosure relates to an electronic device and a method of detecting an environmental value, which are capable of detecting an external environmental value and an approximated environmental value in the electronic device.

BACKGROUND

Mobile devices such as smartphones and tablet personal computers may have various sensors including sensors for measuring environmental values (e.g., a temperature value or a humidity value).

However, operations of the mobile devices may have an effect on precise measured values of the sensors. For example, heat generated during a high-speed operation of the mobile device may have an effect on a temperature sensor for measuring an environmental value in the mobile device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantage and to provide at least the advantages described below. Accordingly, and an aspect of the present disclosure is to provide an electronic device and a method of detecting an environmental value of the electronic device, which are capable of detecting an external environmental value and an approximated environmental value in the electronic device.

In accordance with an aspect of the present disclosure, a method of detecting an environment value of an electronic device is provided. The method includes measuring a state of one or more units related to the electronic device, determining a value based at least in part on the measured state of the one or more units related to the electronic device, determining an operation state of the electronic device according to the value, and generating an approximated environment value according to the operation state.

In accordance with another aspect of the present disclosure, an electronic device is provided. The electronic device includes at least one sensor unit configured to measure a state of at least one unit related to the electronic device, and a controller configured to determine a value based at least in part on the measured state of the one or more units related to the electronic device, to determine an operation state of the electronic device according to the value, and to generate the approximated environment value according to the operation state.

In accordance with another aspect of the present disclosure, a method of determining a state of an electronic device is provided. The method includes iteratively measuring an operating temperature of one or more units of the electronic device, determining a current operation state of the electronic device according to a contemporaneous measured operating temperature of the one or more units of the electronic device, determining a temperature of a surrounding environment of the electronic device, and transitioning between at least a first operating state and a second operating state according to the contemporaneous measured operating temperature relative to a contemporaneous temperature of the surrounding environment.

The electronic device and the method of detecting the environmental value of the electronic device according to various embodiments of the present disclosure can detect the approximated environmental value in the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures

DETAILED DESCRIPTION

Figure 1:
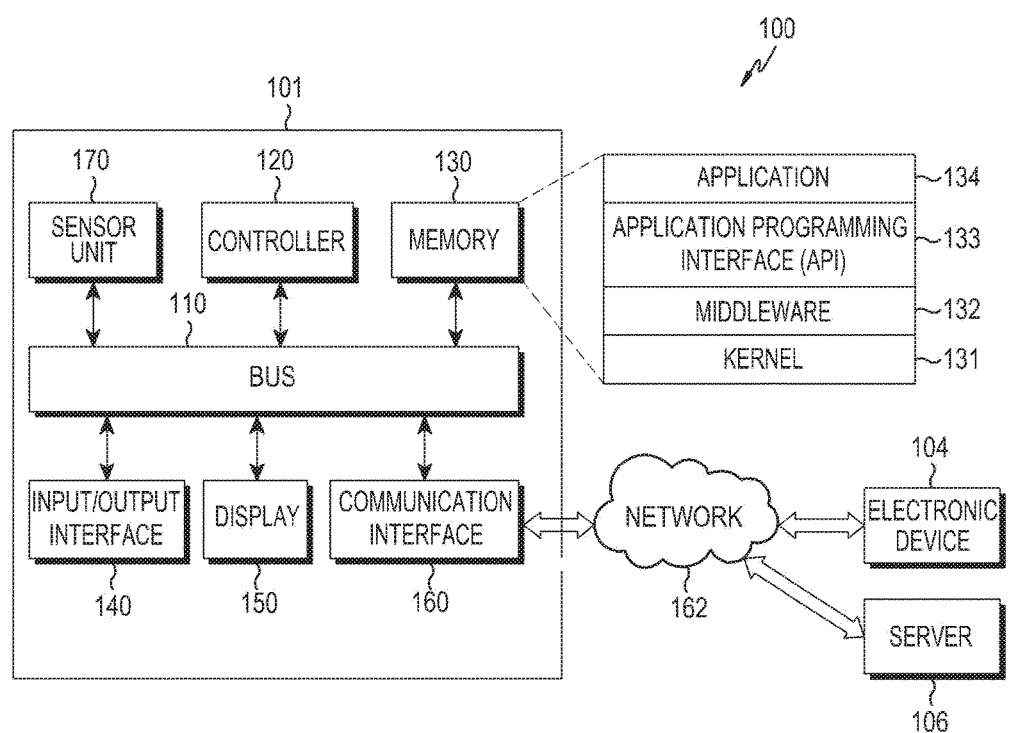
FIG. 1 is a block diagram illustrating a structure of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device having a communication function. For example, the electronic device according to the present disclosure may be one of a smart phone, a tablet Personal Computer (PC), a mobile phone, a video phone, an e-book reader, a desktop PC, a laptop computer, a netbook computer, a Personal Digital Assistant (PDA), a Portable Multimedia. Player (PMP), a MP3 player, a mobile medical appliance, an electronic bracelet, an electronic necklace, an electronic appcessory, a camera, a wearable device, an electronic clock, a wrist watch, home appliances including a refrigerator, an air conditioner, a cleaner, an oven, a microwave oven, a washing machine, an air cleaner, and the like, an artificial intelligence robot, a television, a Digital Video Disk (DVD) player, an audio player, various medical appliances including a Magnetic Resonance Angiography (MRA) device, a Magnetic Resonance Imaging (MRI) device, a Computerized Tomography (CT) device, an ultrasonography device and the like, a navigation device, a Global Positioning System (GPS) receiver, an Event Data Recorder (EDR), a Flight Data Recorder (FDR), a set-top box, a TV box such as HomeSync™ of SAMSUNG Electronics, Co., Apple TV™ of APPLE, Co., and Google TV™ of Google, Co., an electronic dictionary, an infotainment device for a vehicle, an electronic equipment for a ship such as a navigation device and a gyrocompass, an avionic device, a security device, an electronic cloth, an electronic key, a camcorder, a game console, a Head-Mounted Display (HMD) unit, a flat panel display device, an electronic frame, an electronic album, a furniture or a part of a building/structure having a communication function, an electronic board, an electronic signature receiving device, and a protector, or the like, or combinations thereof. It is obvious to a person skilled in the art that the electronic device according to the present disclosure is not limited to the above-mentioned devices.

FIG. 1 is a block diagram illustrating a structure of an electronic device according to an embodiment of the present disclosure.

FIG. 1 shows a network environment 100 including the electronic device 101 according to an embodiment of the present disclosure. Referring to FIG. 1, the electronic device 101 may include a bus 110, a controller 120, a memory 130, an input/output interface 140, a display 150, and a communication interface 160. According to various embodiments of the present disclosure, the electronic device 101 may include a sensor unit 170.

The bus 110 may be a circuit for connecting the above-mentioned structural elements to one another, and transferring communication (e.g., a control message), between the above-mentioned structural elements.

The controller 120, for example, may receive an instruction through the bus 110 from the above-structural elements (e.g., the memory 130, the input/output interface 140, the display 150, the communication interface 160 and the like), decode the received instruction, and execute a calculation or a data processing according to the decoded instruction.

The controller 120 may identify values obtained by measuring states of the structural elements according to the various embodiment of the present disclosure. The values obtained by measuring the states of the structural elements may include a temperature with relation to each internal structural element (e.g., the controller 120, the memory 130, the input/output interface 140, the display 150, the communication interface 160, the sensor unit 170, and/or the like of the electronic device 101). According to the various embodiments of the present disclosure, the state values of the structural elements may include a battery temperature T_BAT obtained by measuring a temperature of a battery (not shown), a controller temperature T_CPU obtained by measuring a temperature of a controller (e.g., a Central Processing Unit (CPU)), a communication interface temperature T_RF obtained by measuring a temperature of a communication interface 160, and a sensor temperature T_SENSOR obtained by measuring a temperature of a sensor 170.

The controller 120 may determine an operation state of the electronic device according to the values obtained by measuring the states of the structural elements and identified.

The controller 120 can calculate a difference of a state value (e.g., T_CPU) of a specific unit among the state values of the structural elements and an environmental measurement value T_RAW measured by a temperature/humidity sensor for measuring an external environmental temperature of the electronic device 101. The controller 120 determines the state of the specific unit as a first state if an absolute value of the difference is smaller than or equal to a second critical value C, and as a second state if the absolute value of the difference is larger than a second critical value C.

The controller 120 may compare the environmental measurement value T_RAW measured by the temperature/humidity sensor for measuring the external environment temperature of the electronic device 101 with a first predetermined critical value R according to various embodiments of the present disclosure. As a result, when the measured environmental value is smaller than or equal to the first critical value R, calculating a difference between the state value of the specific unit and the measured environmental value is possible. The controller 120 determines the state of the specific unit as a first state if the absolute value of the difference is smaller than or equal to the first critical value R, and as the second state if the absolute value of the difference is larger than the first critical value R.

The controller 120 may determine the state of the specific unit as the second state if the measured environmental value T_RAW is larger than the second critical value R in the electronic device 101.

According to the various embodiments of the present disclosure, the first state may include a standby state in which an application is not executed in the electronic device 101, or a low load state of the controller (e.g., CPU). According to various embodiments of the present disclosure, the second state may include a high load state of the controller.

Figure 2:
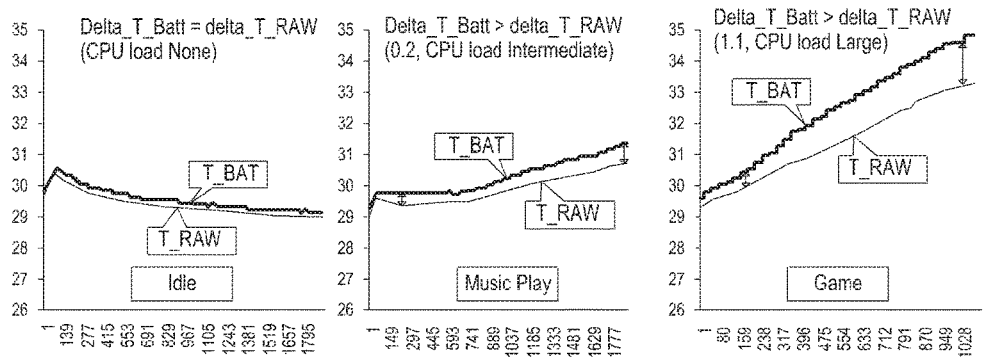
FIG. 2 is a graph illustrating a mutual relation of a temperature of a battery and an environmental value according to a state of an electronic device according to an embodiment of the present disclosure.
Figure 3:
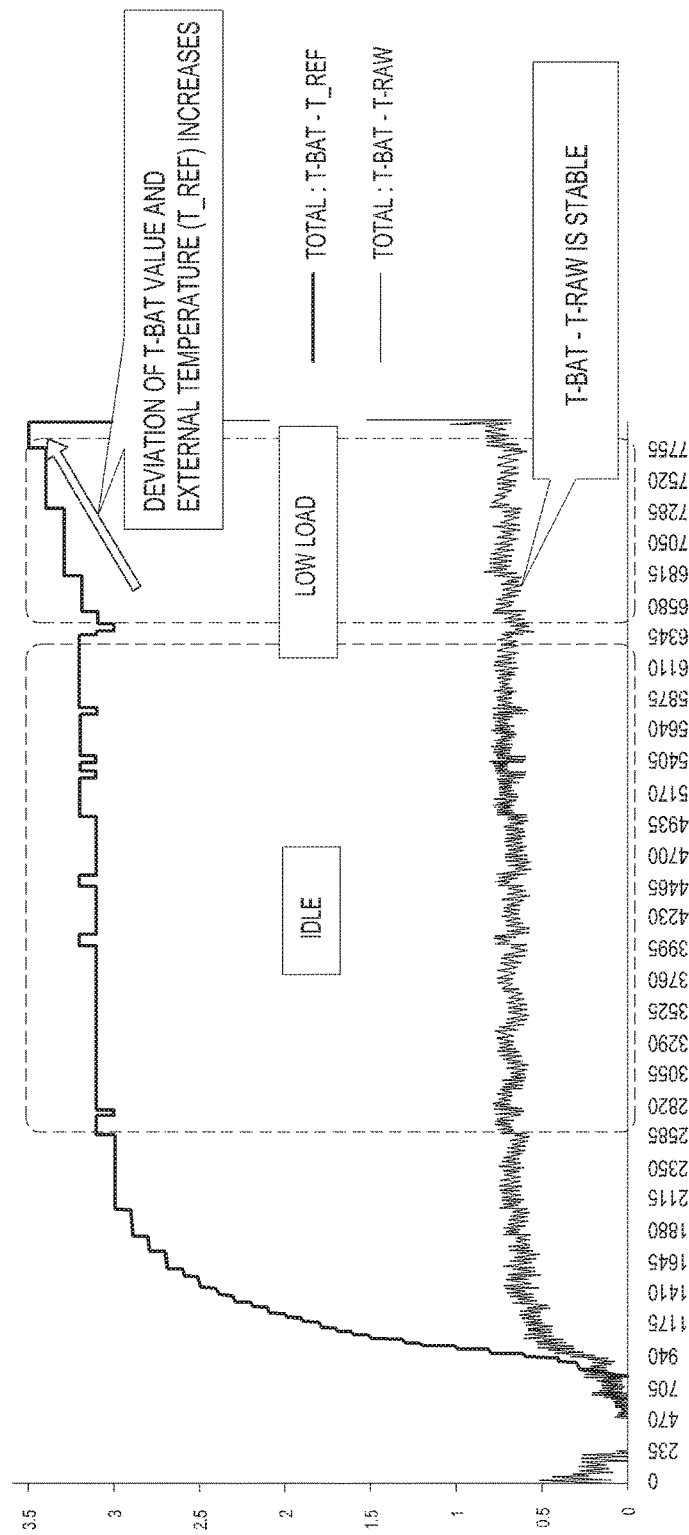
FIG. 3 is a graph illustrating a deviation of a temperature of a battery and an environmental value according to a state of an electronic device according to an embodiment of the present disclosure.

FIG. 2 is a graph illustrating a mutual relation of a battery temperature and an environmental value according to an embodiment of the present disclosure. FIG. 3 is a graph illustrating a deviation of a battery temperature and an environmental value according to a state of an electronic device according to an embodiment of the present disclosure.

Referring to FIG. 2, the graph illustrates that an environmental value (e.g., an external environmental temperature T_RAW), measured in the electronic device increases as a temperature T_BAT of a battery of the electronic device 101 rises. Further, according to the state of the electronic device 101, there is a difference between an increment of the battery temperature T_BAT and an increment of the external environmental temperature T_RAW. The difference between an increment in the battery temperature T_BAT and the increment of the external environmental temperature T_RAW may vary according to a state of the electronic device 101.

For example, according to the example illustrated in the graph of FIG. 2, if the controller has no load in an idling state in which an application is not executed, the increment Delta_T_BAT of the battery temperature T_BAT and the increment Delta_T_RAW of the external environment temperature T_RAW are substantially identical.

As another example, according to the example illustrated in the graph of FIG. 2, if an application for reproducing music with a low load of the controller is executed, a difference between the increment Delta_T_BAT of the battery temperature T_BAT and the increment Delta_T_RAW of the external environment temperature T_RAW is 0.2.

As another example, according to the example illustrated in the graph of FIG. 2, if a high-load application increasing a load of the controller is executed, a difference between the increment Delta_T_BAT of the battery temperature T_BAT and the increment Delta_T_RAW of the external environment temperature T_RAW is 1.1.

Referring to FIG. 3, in the standby state of the electronic device 101, it is understood that a deviation of the battery temperature T_BAT and a measured environment value T_RAW is stably maintained when a deviation of the battery temperature T_BAT and an external environment value T_REF (e.g., an actual external environment value) is maintained.

Further, even if the electronic device 101 is in the state in which the controller has a low load, it is understood that the deviation of the battery temperature T_BAT and the measured environment value T_RAW is stably maintained even if the deviation of the battery temperature T_BAT and the measured environment value T_RAW increases.

According to the various embodiments of the present disclosure, therefore, the controller 120 detects an environmental value (e.g., an external environment temperature) approximated by applying a first compensating algorithm if the electronic device 101 is in a first state (e.g., a standby state or a low load state of the controller). According to the various embodiments of the present disclosure, the first compensating algorithm may be calculated by using Equation (1).

$$T\_COMP = T\_RAW - C2 \qquad \text{Equation (1)}$$

Herein, T_COMP corresponds to the approximated environmental value, T_RAW corresponds to the measured environmental value, and C2 corresponds to a predetermined value.

The C2 is the predetermined value for compensating a temperature value which constantly increases in the first state of the electronic device 101 (e.g., the standby state or the low load state of the controller).

According to various embodiments of the present disclosure, furthermore, the controller 120 detects an environmental value (e.g., an external environment temperature), approximated by applying a second compensating algorithm if the electronic device 101 is in a second state (e.g., a standby state or a high load state of the controller). According to the various embodiments of the present disclosure, the second compensating algorithm may be calculated by using Equation (2).

$$T\_COMP = T\_RAW - C1*(T\_STATE - T\_RAW) - C2$$

Herein, T_COMP corresponds to the approximated environmental value, T_RAW corresponds to the measured environmental value, T_STATE corresponds to a state value of a specific unit, and C1 and C2 are predetermined values. The state value of the specific unit T_STATE comprises a battery temperature T_BAT, a controller temperature T_CPU, a communication interface temperature T_RF, and a sensor temperature T_SENSOR.

Hereinafter, according to various embodiments of the present invention, the state value of the specific unit T_STATE will be described by referring to (as an example of) the battery temperature T_BAT.

Figure 4:
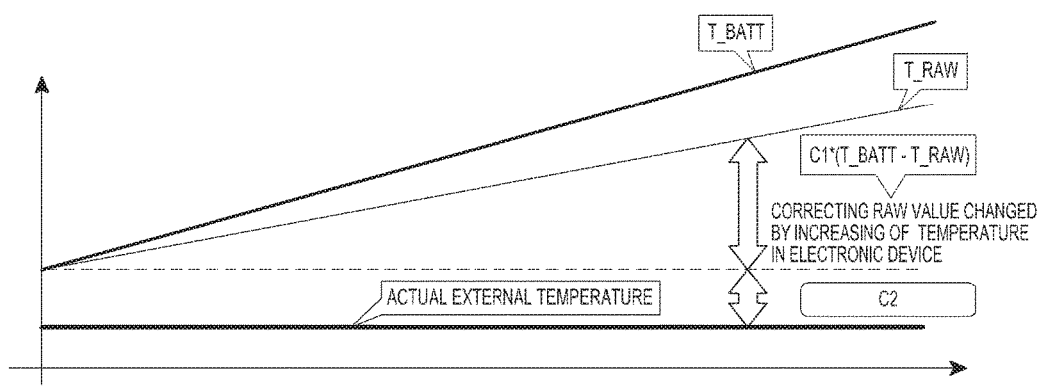
FIG. 4 is a graph illustrating a second compensating algorithm in an electronic device according to an embodiment of the present disclosure.

FIG. 4 is a graph illustrating a second compensating algorithm in an electronic device according to an embodiment of the present disclosure.

Referring to FIG. 4, if the environmental value T_RAW increases in the state of a high load controller as the battery temperature T_BAT increases, it is possible to detect an actual external temperature and an approximated environmental value (an external temperature) by applying the second compensating algorithm.

The memory 130 may store instructions or data which are received from the controller 120 or other structural elements (e.g., the input/output interface unit 140, the display unit 150, the communication interface unit 160, and/or the like), or that are generated by the controller 120 or other structural elements. The memory 130 may include, for example, programming modules such as a kernel 131, a middleware 132, an Application Programming Interface (API) 133, an application 134, and the like. Each of the above-mentioned programming modules may include software, firmware, hardware, or combination of at least two thereof.

The kernel 131 may control or manage system resources (e.g., the bus 110, the controller 120, the memory 130, and/or the like), used for executing an operation or a function implemented in other programming modules (e.g., the middleware 132, the API 133, the application 134, and/or the like). Further, the kernel 131 may provide an interface through which the middleware 132, the API 133, the application 134, and/or the like accesses and controls or manages an individual structural element of the electronic device 101.

The middleware 132 may function as an intermediary so that the API 133 or the application 134 communicates with the kernel 131 to transmit and to receive data. Further, with relation to task requests received from the application 134, the middleware 132 may perform a control for the task request (e.g., scheduling, load balancing, and/or the like) by using a method of assigning a priority to use the system resources of the electronic device 101 (e.g., the bus 10, the processor 120, the memory 130, and/or the like), to at least one of the applications 134.

The API 133 is an interface for allowing the application 134 to control functions provided by the kernel 131, the middleware 132, and/or the like, and may include at least one interface or function (e.g., instruction), for a file control, a window control, an image processing control, a message control, and/or the like.

According to the various embodiments of the present disclosure, the application 134 may include a Short Message Service (SMS)/a Multimedia Messaging Service (MMS) application, an E-mail application, a calendar application, an alarm application, a health-care application (e.g., an application for measuring a quantity of motion, a blood sugar, and/or the like), an environment informing application (e.g., an application for providing information on an atmospheric pressure, a humidity, a temperature, and/or the like), an application for determining a context of the electronic device 101, and/or the like. Additionally or alternatively, the application 134 may be an application relating to an exchange of information between the electronic device 101 and an external electronic device (e.g., an electronic device 104). The application relating to the exchange of the information between the electronic device 101 and the external electronic device may include, for example, a notification relay application for transferring specific information to the external electronic device, a device management application for managing the external electronic device, and/or the like.

For example, the notification relay application may include a function of transferring notification information, which is provided by other applications (e.g., the SMS/MMS application, the E-mail application, the health-care application, the environment information application, and/or the like of the electronic device 101), to the external electronic device (e.g., the electronic device 104). Additionally or alternatively, the notification relay application, for example, may receive notification from the external electronic device (e.g., the electronic device 104), and provide the notification to a user. The device management application, for example, may turn on/off some functions (e.g., external electronic device itself) or some structural parts, of the external electronic device (e.g., the electronic device 104), adjust brightness (or resolution) of a display unit, and manage, install, delete or update services (e.g., a call service or a message service), provided by an application operating in the external electronic device or by the external electronic device.

According to the various embodiments of the present disclosure, the application 134 may include a designated application according to a property of the external electronic device 104 (e.g., a type of the electronic device). For example, if the external electronic device is an MP3 player, then the application 134 may include an application related to a reproduction of music. Similarly, if the external electronic device is a mobile medical appliance, then the application 134 may include an application related to a health-care. According to various embodiments of the present disclosure, the application 134 may include at least one of an application designated for the electronic device 101 and an application received from the external electronic device (e.g., a server 106 or the electronic device 104).

The input/output interface 140 may transmit an instruction or data input by a user through the input/output device (e.g., a sensor, a keyboard, a touch screen, and/or the like) to the controller 120, the memory 130, the communication interface 160, and/or the like through the bus 120. For example, the input/output interface 140 may provide data for a user's touch input through a touch screen to the processor 120. Further, the input/output interface 140 may output instructions or data, which are received through the bus 110 from the processor 120, the memory 130, the communication interface 160, and/or the like through the input/output device (e.g., a speaker or a display unit). For example, the input/output interface 140 may output voice data, which is processed by the controller 120, to the user through the speaker.

The display unit 150 may display various information (e.g. multimedia data, text data, a graphical user interface, and/or the like), to the user.

The communication interface 160 may connect communication between the electronic device 101 and the external device (e.g., the electronic device 104 and/or the server 106). For example, the communication interface 160 may be connected to a network by wireless communication or wired-cable communication, so as to communicate with the external device. The wireless communication may include, for example, at least one of WiFi communication, Bluetooth communication, Near Field Communication (NFC), Global Positioning System (GPS), cellular communication (e.g., Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (WiBro) Global System for Mobile Communications (GSM), Infrared Data Association communication (IrDA), WiFi Direct, and/or the like. The wired-cable communication may include at least one of a Universal Serial Bus (USB), a High Definition Multimedia Interface (HDMI), a Recommended Standard 232 (RS-232), a Plain Old Telephone Service (POTS), and/or the like.

According to various embodiments of the present disclosure, the network 162 may be a telecommunication network. The communication network may include at least one of a computer network, an internet, an internet of things, a telephone network, and/or the like. According to various embodiments of the present disclosure, a protocol for communication of the electronic device 101 with the external device (e.g., a transport layer protocol, data link layer protocol, or a physical layer protocol), may be supported by at least one of the application 134, the API 133, the middleware 132, the kernel 131, the communication interface 160, or the like.

The sensor 170 may measure at least one state related to the electronic device 101. The sensor unit 170 measures a physical quantity, detects an operation state of the electronic device 101, and converts measured or detected information into an electric signal. The sensor unit 170 may include, for example, at least one of a gesture sensor, a gyro sensor, an atmospheric pressure sensor, a magnetic sensor, an acceleration meter, a grip sensor, a proximity sensor, a color sensor (e.g., Red, Green, Blue (RGB) sensor), a living body sensor, a temperature/humidity sensor, an illuminance sensor, an ultraviolet sensor, and/or the like. Additionally or alternatively, the sensor unit 170 may include, for example, an E-nose sensor, an electromyography sensor, an electroencephalogram sensor, an electrocardiogram sensor, an infrared sensor, an eye-scanning sensor, a fingerprint-scanning sensor, and/or the like. The sensor unit 170 may further include a control circuit for controlling one or more sensors included therein.

An operation of detecting an actual environment value (an external temperature) and an approximated environment value (an external temperature) in the electronic device having the above-described structure will be described in detail with reference to FIGS. 5 and 6.

Hereinafter, a temperature T_CPU of the controller and a temperature T_BAT of the battery will be described as an example of at least one state value measured with relation to the electronic device to detect the external environment value (external temperature) and the approximated environment value (external temperature) in the various embodiments of the present disclosure. However, the state value is not limited to the temperature T_CPU of the controller and the temperature T_BAT of the battery.

Figure 5:
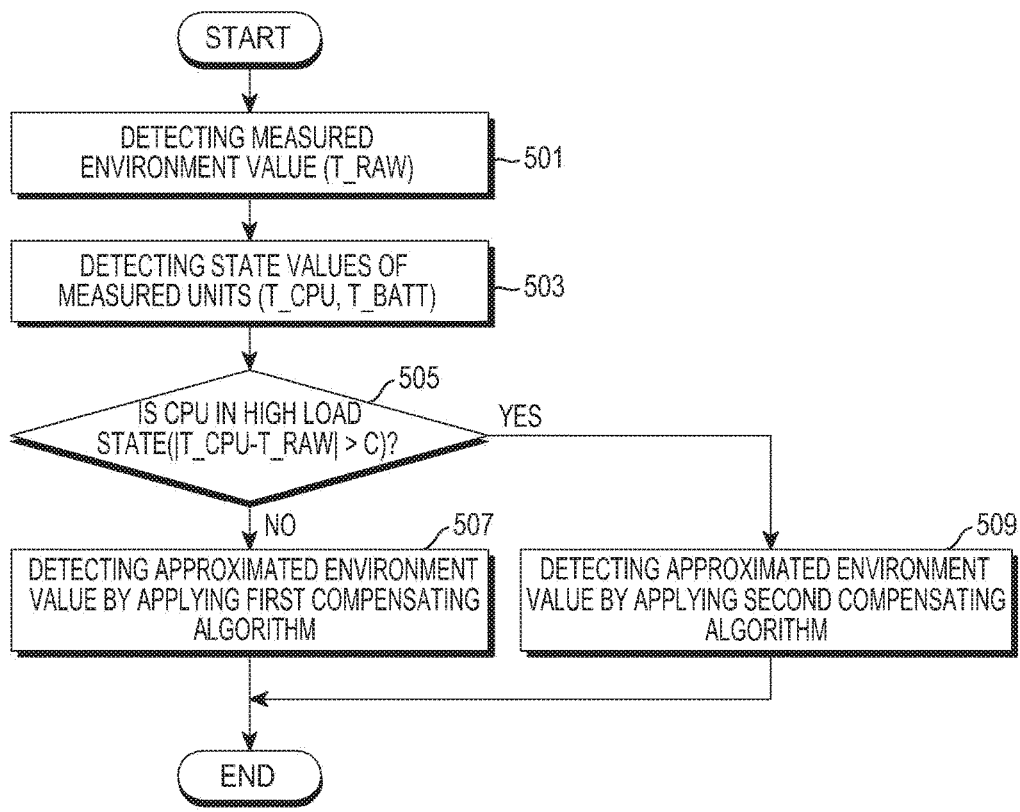
FIG. 5 is a flowchart illustrating a process of detecting an approximated environment value in an electronic device according to an embodiment of the present disclosure.

FIG. 5 is a flowchart illustrating a process of detecting an approximated environment value in the electronic device according to an embodiment of the present disclosure.

Hereinafter, various embodiments of the present disclosure will be described with reference to FIG. 1 as follows.

Referring to FIG. 5, at operation 501, the controller 120 may receive an external temperature value T_RAW which is an environmental value measured by the temperature/humidity sensor included in the sensor unit 170 of the electronic device 101. According to various embodiments of the present disclosure, the controller 120 may operatively detect the external temperature value T_RAW using, for example, the sensor unit 170.

At operation 503, the controller 120 may receive a temperature T_CPU of the controller 120 and a temperature T_BAT of the battery respectively measured by the controller sensor and the battery sensor included in the sensor unit 170 of the electronic device 101. According to various embodiments of the present disclosure, the controller 120 may operatively detect the temperature T_CPU of the controller 120 and the temperature T_BAT of the battery using, for example, the sensor unit 170.

At operation 505, the controller 120 may calculate a difference between the measured environment value T_RAW and the temperature T_CPU of the controller 120, and compare an absolute value |T_CPU−T_RAW| of the difference with a second critical value C which is predetermined. According to various embodiments of the present disclosure, the controller 120 may determine whether the electronic device 101 is in a first state, a high load state, and/or the like according to the calculated difference between the measured environment value T_RAW and the temperature T_CPU of the controller 120.

At operation 505, the controller 120 may determine that the electronic device 101 is in a first state (e.g., a standby state or a low load state of the controller) if the controller 120 determines that the absolute value |T_CPU−T_RAW| of the difference is smaller than or equal to the second critical value C. If the controller 120 determines that the electronic device 101 is in the first state (e.g., if the controller 120 determines that the electronic device 101 is not in the high load state), then the controller 120 may proceed to operation 507.

At operation 507, the controller 120 may detect an external temperature and an environment value T_COMP approximated to the external temperature from the measured environment value T_RAW by applying Equation (1) of the first compensating algorithm.

Alternatively, at operation 505, the controller 120 may determine that the electronic device 101 as a second state (e.g., a high load state of the controller) if the controller 120 determines that the absolute value |T_CPU−T_RAW| of the difference is larger than the second critical value C. If the controller 120 determines that the electronic device 101 is in the second state (e.g., if the controller 120 determines that the electronic device 101 is in the high load state), then the controller 120 may proceed to operation 509.

At operation 509, the controller 120 may detect an external temperature and an environment value T_COMP approximated to the external temperature from the measured environment value T_RAW by applying Equation (2) of the second compensating algorithm.

According to various embodiments of the present disclosure, the controller 120 can monitor the absolute value |T_CPU−T_RAW| of the difference. As the result of monitoring the absolute value |T_CPU−T_RAW|, if the controller 120 determines that the absolute value of the difference in the first state of the electronic device 101 is larger than the second critical value C, then the controller 120 may change the state of the electronic device 101 from the first state to the second state.

As the result of monitoring the absolute value |T_CPU−T_RAW|, if the controller 120 determines that the absolute value of the difference in the second state of the electronic device 101 is smaller than or equal to the second critical value C, then the controller 120 may change the state of the electronic device 101 from the second state to the first state.

Figure 6:
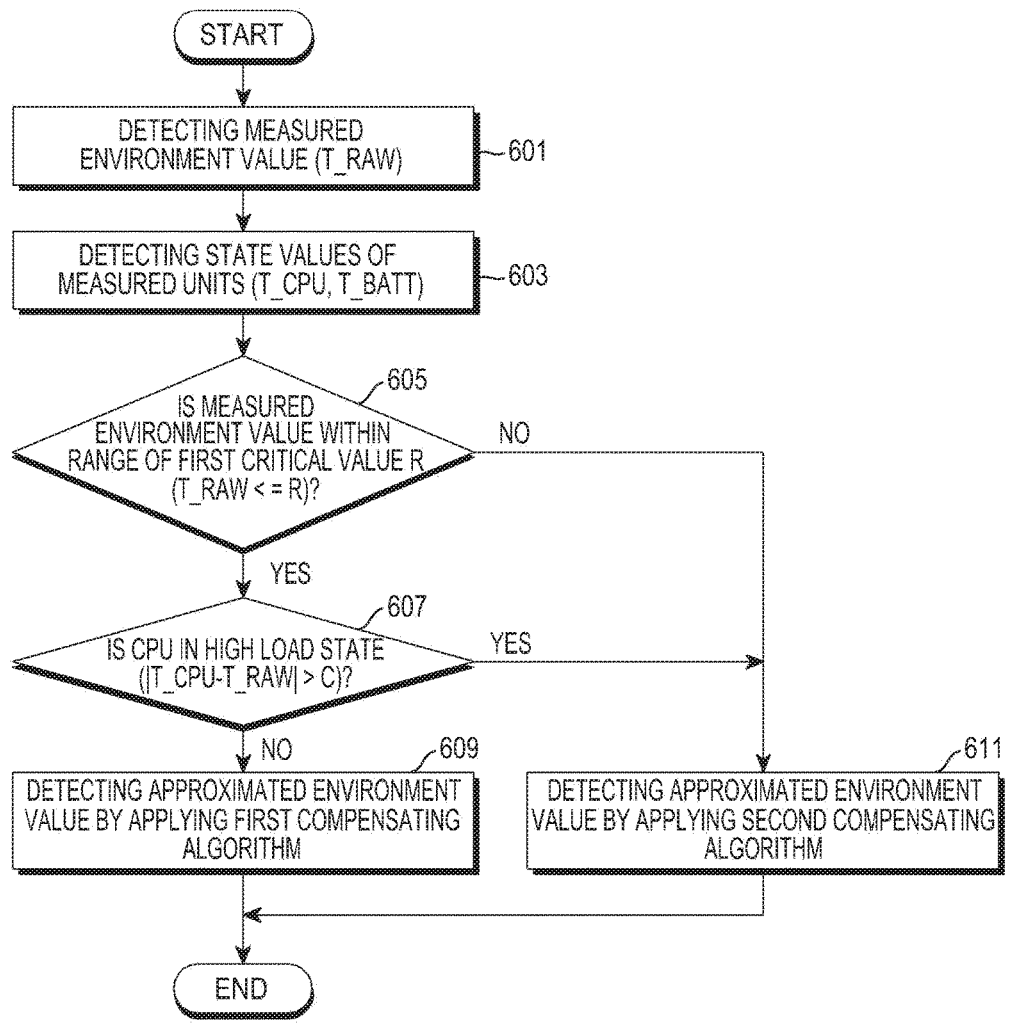
FIG. 6 is a flowchart illustrating a process of detecting an approximated environment value in an electronic device according to an embodiment of the present disclosure.

FIG. 6 is a flowchart illustrating a process of detecting an approximated environment value in an electronic device according to an embodiment of the present disclosure.

Hereinafter, various embodiments of the present disclosure will be described with reference to FIG. 1 as follows.

Referring to FIG. 6, at operation 601, the controller 120 may receive an external temperature value T_RAW which is an environmental value measured by the temperature/humidity sensor included in the sensor unit 170 of the electronic device 101. According to various embodiments of the present disclosure, the controller 120 may operatively detect the external temperature value T_RAW using, for example, the sensor unit 170.

At operation 603, the controller 120 may receive a temperature T_CPU of the controller 120 and a temperature T_BAT of the battery, which are respectively measured by the controller sensor and the battery sensor included in the sensor unit 170 of the electronic device 101. According to various embodiments of the present disclosure, the controller 120 may operatively detect the temperature T_CPU of the controller 120 and the temperature T_BAT of the battery using, for example, the sensor unit 170.

Because accuracy of the first compensating algorithm may be lowered under sudden variation environment of temperature, comparing the measured environment value T_RAW and a first critical value R, the controller 120 may determine whether the measured environment value T_RAW is measured under a sudden variation environment of temperature.

Therefore, at operation 605, the controller 120 may compare the measured environment value T_RAW with a first critical value R. According to various embodiments of the present disclosure, the controller 120 may determine whether the measured environment value is within a range of the first critical value R (e.g., the controller 120 may determine whether T_RAW<=R).

If the controller 120 determines that the measured environment value T_RAW is larger than the first critical value R at operation 605, the controller 120 determines that the measured environment value T_RAW is measured under a sudden variation environment of temperature and then the controller 120 may proceed to operation 611 at which the controller 120 may detect an environment value T_COMP approximated to the external temperature from the measured environment value T_RAW by applying Equation (2) of the second compensating algorithm.

In contrast, if the controller 120 determines that the measured environment value T_RAW is smaller than or equal to the first critical value R at operation 605, then the controller 120 may proceed to operation 607 at which the controller 120 may calculate a difference between the temperature T_CPU of the controller and the measured environment value, and compare the absolute value |T_CPU−T_RAW| of the difference with the second critical value C. For example, at operation 607, the controller 120 may determine whether the electronic device 101 (e.g., the controller 120) is in a high load state.

At operation 607, the controller 120 may determine that the electronic device 101 is in a first state (e.g., a standby state or a low load state of the controller) if the controller 120 determines that the absolute value |T_CPU−T_RAW| of the difference is smaller than or equal to the second critical value C. If the controller 120 determines that the electronic device 101 is in the first state (e.g., if the controller 120 determines that the electronic device 101 is not in the high load state), then the controller 120 may proceed to operation 609

At operation 609, the controller 120 may detect an environment value T_COMP approximated to the external temperature from the measured environment value T_RAW by applying Equation (1) of the first compensating algorithm.

Alternatively, at operation 607, the controller 120 may determine that the electronic device 101 is in a second state (e.g., a high load state of the controller) if the controller 120 determines that the absolute value |T_CPU−T_RAW| of the difference is larger than the second critical value C. If the controller 120 determines that the electronic device 101 is in the second state (e.g., if the controller 120 determines that the electronic device 101 is in the high load state), then the controller 120 may proceed to operation 611.

At operation 611, the controller 120 may detect an environment value T_COMP approximated to the external temperature from the measured environment value T_RAW by applying Equation (2) of the second compensating algorithm.

According to various embodiments of the present disclosure, the controller 120 can monitor the absolute value |T_CPU−T_RAW| of the difference. As the result of monitoring the absolute value |T_CPU−T_RAW|, if the controller 120 determines that the absolute value of the difference in the first state of the electronic device 101 is larger than the second critical value C, then the controller 120 may change the state of the electronic device 101 from the first state to the second state.

As the result of monitoring the absolute value |T_CPU−T_RAW|, if the controller 120 determines that the absolute value of the difference in the second state of the electronic device 101 is smaller than or equal to the second critical value C, then the controller 120 may change the state of the electronic device 101 from the second state to the first state.

Figure 7:
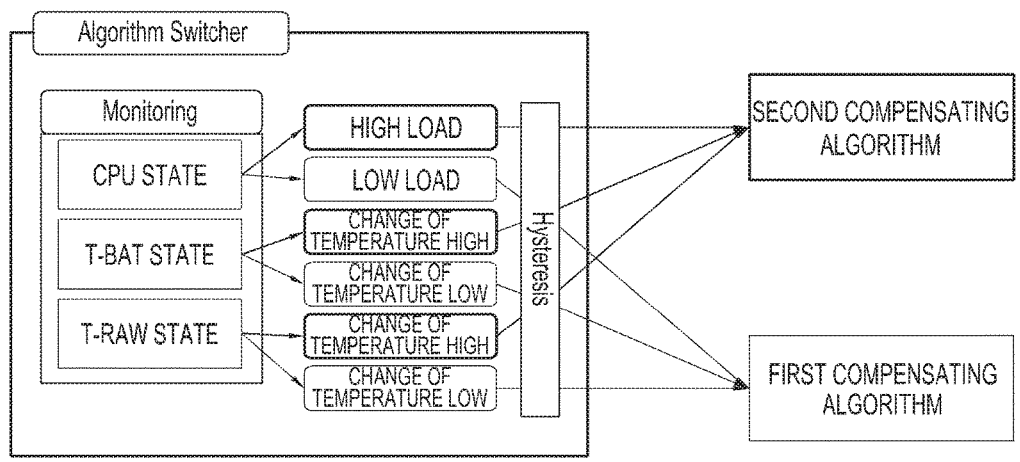
FIG. 7 is a view illustrating a discriminative application of an algorithm according to an environmental value and a state of an electronic device according to an embodiment of the present disclosure.

FIG. 7 is a view illustrating a discriminative application of an algorithm according to an environmental value and a state of an electronic device according to an embodiment of the present disclosure.

Referring to FIG. 7, the controller 120 may monitor the state of the controller, the temperature T_BAT of the battery and the measured environment value T_RAW by using the measured state value related to the electronic device 101. The controller 120 may detect the environment value T_COMP approximated to the external temperature from the measured environment value T_RAW by applying the first compensating algorithm if the controller 120 determines that the controller is in a low load state. If the controller 120 determines that the controller is in a high load state, then the controller 120 may detect the environment value T_COMP approximated to the external temperature from the measured environment value T_RAW by applying the second compensating algorithm.

In contrast, the controller determines that a variation of the temperature is low when the temperature T_BAT of the battery is smaller than or equal to the predetermined critical value, and may detect an environment value T_COMP approximated to the external temperature from the measured environment value T_RAW by applying the first compensating algorithm. In contrast, the controller determines that a variation of the temperature is high when the temperature T_BAT of the battery is larger than the predetermined critical value, and may detect an environment value T_COMP approximated to the external temperature from the measured environment value T_RAW by applying the second compensating algorithm.

Alternatively, the controller 120 determines that a variation of the temperature is low when the measured environment value T_RAW is smaller than or equal to the first critical value R which is predetermined, and may detect the environment value T_COMP approximated to the external temperature from the measured environment value T_RAW by applying the first compensating algorithm. Alternatively, the controller 120 determines that a variation of the temperature is high when the measured environment value T_RAW is larger than the first critical value R which is predetermined, and may detect the environment value T_COMP approximated to the external temperature from the measured environment value T_RAW by applying the second compensating algorithm.

Figure 8:
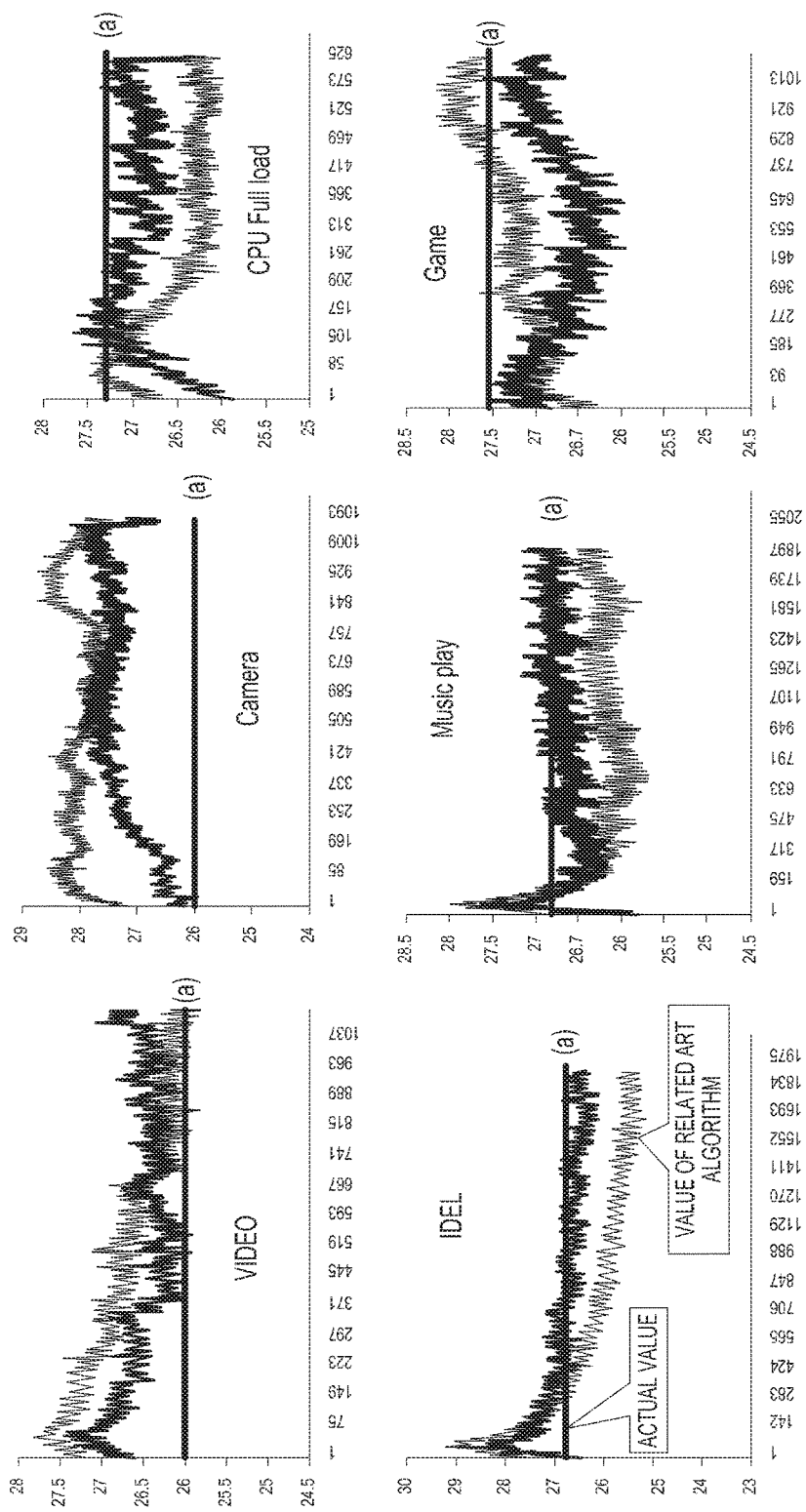
FIGS. 8 and 9 are graphs illustrating a comparison and an analysis of environmental values obtained by applying a compensating algorithm according to various embodiments of the present disclosure and a compensating algorithm of the related art according to a state of an electronic device.
Figure 9:
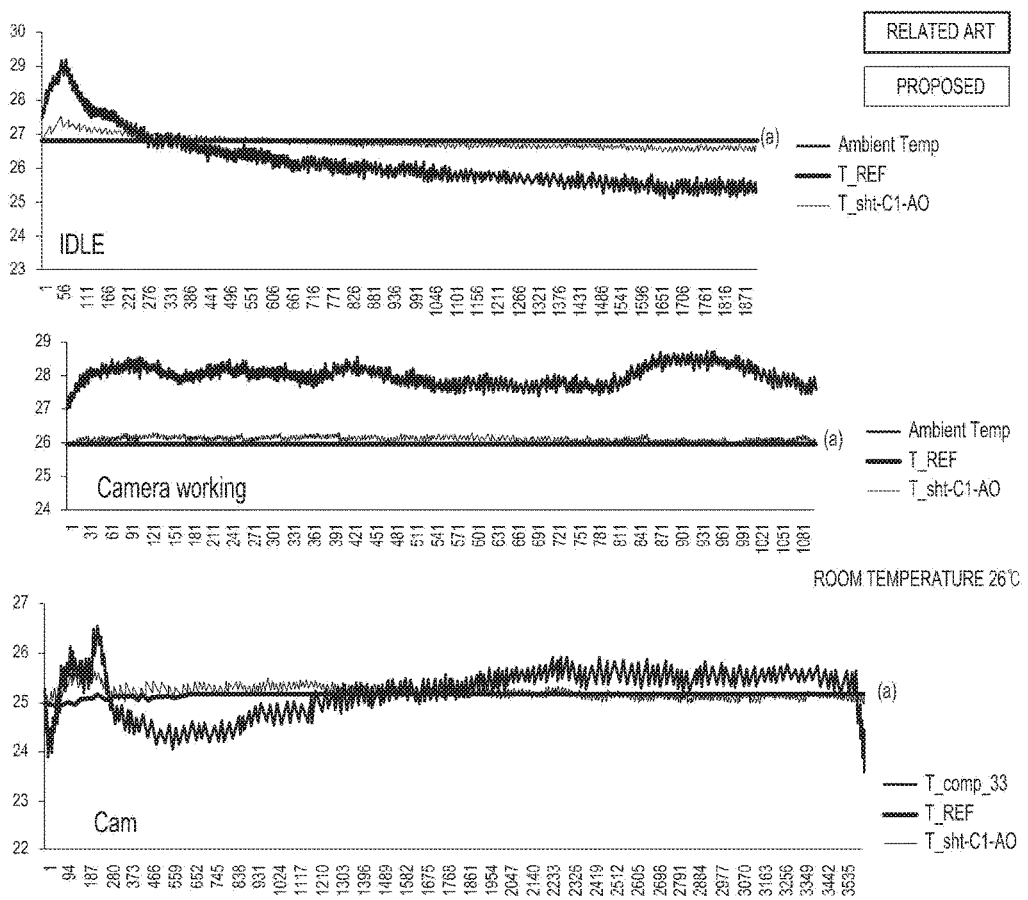

FIGS. 8 and 9 are graphs illustrating a comparison and an analysis of environmental values obtained by applying a compensating algorithm according to various embodiments of the present disclosure and a compensating algorithm of the related art according to a state of an electronic device.

Referring to FIGS. 8 and 9, when the compensating algorithms according to various embodiments of the present disclosure and the related art are applied in the approximation of the environment value according to the state of the electronic device, it is understood that the environment value T_COM approximated by applying the compensating algorithm according to various embodiments of the present disclosure is approximated to the actual external temperature A.

The electronic device and the method of detecting the environment value of the electronic device according to the various embodiments of the present disclosure can be implemented as codes which are stored in a non-transitory computer-readable medium and read by a computer. The non-transitory computer-readable recording medium includes all the types of recording devices in which data readable by a computer system are stored. As for such a recording medium, for example, a Read Only Memory (ROM), a Random Access Memory (RAM), an optical disc, a magnetic tape, a floppy disc, a hard disc, or a non-volatile memory may be used, and a medium implemented in a type of carrier wave (e.g., transmission through the Internet) may also be included in such a recording medium. In addition, the computer-readable recording medium may be stored with codes which are distributed in computer systems connected by a network such that the codes can be read and executed by a computer in a distributed method.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a sensor configured to obtain an environment value indicating a degree of an environment attribute external to the electronic device; and
    at least one processor configured to:
        obtain at least one value indicating a degree of at least one attribute of the electronic device,
        identify an operation state of the electronic device based at least in part on the obtained at least one value,
        in response to identifying that the operation state is a first operation state, compensate the environment value using a first compensation scheme,
        in response to identifying that the operation state is a second operation state, compensate the environment value using a second compensation scheme, and
        change the operation state of the electronic device from the first operation state to the second operation state, or from the second operation state to the first operation state based on a comparison of a critical value and a difference between the obtained environment value and the obtained at least one value.

2. The electronic device of claim 1, wherein the at least one processor is further configured to:
    obtain a temperature value or a humidity value as at least part of the environment value.

3. The electronic device of claim 1, wherein the at least one processor is further configured to:
    identify the operation state of the electronic device based at least in part on a state of at least one hardware resource of the electronic device.

4. The electronic device of claim 3, wherein the at least one hardware resource comprises a communication module, the sensor, the at least one processor, another processor, or a battery of the electronic device.

5. The electronic device of claim 1, wherein the at least one processor is further configured to:
    identify that the operation of the electronic device is the first operation state if a first specified application is executed in the electronic device, and
    identify that the operation state of the electronic device is the second operation state if a second specified application is executed in the electronic device.

6. The electronic device of claim 1, wherein the at least one processor is further configured to:
    identify that the operation of the electronic device is the first operation state if an application executed in the electronic device is in a standby state or an idle state, and
    identify that the operation of the electronic device is the second operation state if the application is in a busy state.

7. The electronic device of claim 1, wherein the at least one processor is further configured to:
    identify that the operation of the electronic device is the first operation state if the electronic device is in a low speed operation state, and
    identify that the operation of the electronic device is the second operation state if the electronic device is in a high speed operation state.

8. The electronic device of claim 1, wherein the at least one processor is further configured to:
    use a state value corresponding to a hardware resource as at least part of at least one of the first compensation scheme or the second compensation scheme.

9. The electronic device of claim 1, wherein the at least one processor is further configured to:
    use a specified value as at least part of a corresponding at least one of the first compensation scheme or the second compensation scheme.

10. An electronic device comprising:
    at least one processor configured to:
        obtain an environment value indicating a degree of an environment attribute external to the electronic device,
        obtain at least one value indicating a degree of at least one attribute of the electronic device,
        identify an operation state of the electronic device based at least in part on the obtained at least one value,
        in response to identifying that the operation state is a first operation state, compensate the environment value using a first compensation scheme,
        in response to identifying that the operation state is a second operation state, compensate the environment value using a second compensation scheme, and
        change the operation state of the electronic device from the first operation state to the second operation state, or from the second operation state to the first operation state based on a comparison of a critical value and a difference between the obtained environment value and the obtained at least one value.

11. The electronic device of claim 10, wherein the at least one processor is further configured to:
    obtain the environment value via a sensor external to the electronic device.

12. The electronic device of claim 10, wherein the at least one processor is further configured to:
    identify the operation state of the electronic device based at least in part on a state value of at least one hardware resource of the electronic device.

13. The electronic device of claim 12, wherein the at least one hardware resource comprises the communication module, the sensor, the at least one processor, another processor, or a battery of the electronic device.

14. The electronic device of claim 10, wherein the at least one processor is further configured to:
    identify that the operation of the electronic device is the first operation state if the electronic device is in a standby state or an idle state, and
    identify that the operation of the electronic device is the second operation state if the electronic device is in a busy state.

15. The electronic device of claim 10, wherein the at least one processor is further configured to:

present a compensated environment value based on one of the first compensation scheme and the second compensation scheme.

16. An electronic device comprising:
at least one processor adapted to:
    obtain an environment value indicating a degree of an environment attribute external to the portable communication device,
    obtain at least one value indicating a degree of at least one attribute of the electronic device,
    identify an operation state of the electronic device based at least in part on the obtained at least one value,
    in response to identifying whether the electronic device is in a first operation state or a second operation state, compensate the environment value using a corresponding scheme of a first compensation scheme and a second compensation scheme, respectively,
    present the compensated environment value by compensating the environment value based at least in part on the corresponding scheme, and
    change the operation state of the electronic device from the first operation state to the second operation state, or from the second operation state to the first operation state based on a comparison of a critical value and a difference between the obtained environment value and the obtained at least one value.

17. The electronic device of claim 16, wherein the at least one processor is further configured to:
    identify that the operation of the electronic device is the first operation state if an application is in a standby state or an idle state, and
    identify that the operation of the electronic device is the second operation state if the application is in a busy state.

18. The electronic device of claim 16, wherein the at least one processor is further configured to:
    identify that the operation of the electronic device is the first operation state if the electronic device is in a low speed operation state, and
    identify that the operation of the electronic device is the second operation state if the electronic device is in a high speed operation state.

19. The electronic device of claim 16, wherein the at least one processor is further configured to:
    use a specified value as at least part of the first compensation scheme, and a state value corresponding to a hardware resource as at least part of the second compensation scheme.

20. The electronic device of claim 19, wherein the at least one processor is further configured to:
    obtain a temperature value as at least part of the state value.

* * * * *